US010095309B2

(12) United States Patent
Chen et al.

(10) Patent No.: US 10,095,309 B2
(45) Date of Patent: Oct. 9, 2018

(54) INPUT DEVICE, SYSTEM AND METHOD FOR FINGER TOUCH INTERFACE

(71) Applicants: National Taiwan University, Taipei (TW); Mediatek Inc., Hsin Chu OT (CN)

(72) Inventors: Bing-Yu Chen, Taipei (TW); Da-Yuan Huang, Taipei (TW); Li-Wei Chan, Taipei (TW); Shuo Yang, Taipei (TW); Rong-Hao Liang, Jerusalem (IL)

(73) Assignee: MEDIATEK INC., Hsin Chu (TW)

( * ) Notice: Subject to any disclaimer, the term of this patent is extended or adjusted under 35 U.S.C. 154(b) by 0 days.

(21) Appl. No.: 15/588,165

(22) Filed: May 5, 2017

(65) Prior Publication Data

US 2018/0067552 A1 Mar. 8, 2018

(30) Foreign Application Priority Data

Sep. 8, 2016 (TW) .............................. 105129112 A

(51) Int. Cl.
*G06F 3/01* (2006.01)
(52) U.S. Cl.
CPC .............. *G06F 3/014* (2013.01); *G06F 3/017* (2013.01)
(58) Field of Classification Search
CPC .................................. G06F 3/014; G06F 3/017
USPC .......................................... 345/156, 170–176
See application file for complete search history.

(56) References Cited

U.S. PATENT DOCUMENTS

| 9,652,038 B2 * | 5/2017 | Osman | G06F 3/014 |
|---|---|---|---|
| 2008/0036456 A1 * | 2/2008 | Kishida | G01R 33/04 324/244 |
| 2009/0288244 A1 * | 11/2009 | Fullerton | A41D 13/0002 2/456 |
| 2010/0219989 A1 * | 9/2010 | Asami | G06F 3/014 341/20 |
| 2010/0220054 A1 * | 9/2010 | Noda | G06F 3/014 345/156 |
| 2012/0092250 A1 * | 4/2012 | Hadas | G06F 3/03547 345/156 |
| 2014/0085177 A1 * | 3/2014 | Lyons | G06F 3/014 345/156 |
| 2016/0062460 A1 * | 3/2016 | Li | G06F 3/046 345/174 |
| 2016/0246369 A1 * | 8/2016 | Osman | A63F 13/212 |
| 2016/0246370 A1 * | 8/2016 | Osman | A63F 13/428 |
| 2016/0256370 A1 | 9/2016 | Alabata et al. | |
| 2016/0292563 A1 * | 10/2016 | Park | G06K 19/07762 |

(Continued)

FOREIGN PATENT DOCUMENTS

CN 103246349 A 8/2013
CN 103729054 A 4/2014
(Continued)

*Primary Examiner* — Tony Davis
(74) *Attorney, Agent, or Firm* — Muncy, Geissler, Olds & Lowe, P.C.

(57) ABSTRACT

An input device for a finger touch interface includes a magnetic unit worn on a tip of a user's thumb for establishing a magnetic field, at least a first magnetic field sensing unit worn on the tip of any finger except the thumb and at least a second magnetic field sensing unit worn on a segment of any finger except the thumb. The first/second magnetic field sensing unit is used to detect magnetic flux density of the magnetic field so as to generate a corresponding signal as an input instruction.

20 Claims, 3 Drawing Sheets

(56) References Cited

U.S. PATENT DOCUMENTS

2017/0205880 A1\* 7/2017 Osman .................... G06F 3/014
2018/0067552 A1\* 3/2018 Chen ....................... G06F 3/017

FOREIGN PATENT DOCUMENTS

| CN | 203838740 U   | 9/2014  |
| -- | ------------- | ------- |
| CN | 204740561 U   | 11/2015 |
| CN | 105575219 A   | 5/2016  |
| CN | 105919599 A   | 9/2016  |
| WO | 2016/132371 A1 | 8/2016 |

\* cited by examiner

INPUT DEVICE, SYSTEM AND METHOD FOR FINGER TOUCH INTERFACE

CROSS-REFERENCE TO RELATED APPLICATION

This application claims under 35 U.S.C. § 119(a) the benefit of Taiwanese Patent Application No.105129112 filed Sep. 8, 2016, the entire contents of which are incorporated herein by reference.

BACKGROUND

1. Technical Field

The present disclosure relates to computer input technologies, and more particularly, to an input device, system and method for a finger touch interface.

2. Description of Related Art

Handheld or head-mounted display devices have become one of the development trends of current display technologies. For example, Google Glass can display personal information to a user and it is difficult for others nearby to look in the contents. That is, such a device provides high privacy and security.

However, such a device lacks an input method with high privacy and security. For example, Google Glass generally uses a voice input method. As such, inputting a password in a public place may not be safe. Also, voice input may be adversely affected by ambient noise.

On the other hand, human hands can make many different gestures and actions. A suitable hand sensing device may be configured to sense a gesture or action of a user's hand and transform it into an electrical signal that can further be used by a back end device. As such, human-computer interaction is improved. However, similar to voice input, such a gesture or action made by the user may be easily identified by others nearby.

Therefore, there is a need to provide input technologies with high privacy and security.

SUMMARY

In view of the above-described drawbacks, the present disclosure provides an input device for a finger touch interface, which comprises: a magnetic unit worn on a tip of a user's thumb for establishing a magnetic field; at least a first magnetic field sensing unit worn on a tip of any finger except the thumb, wherein the first magnetic field sensing unit includes a first substrate and a plurality of first sensors mounted on the first substrate; and at least a second magnetic field sensing unit worn on a segment of any finger except the thumb, wherein the second magnetic field sensing unit includes a second substrate and a plurality of second sensors mounted on the second substrate, and wherein the first or second sensors are configured to detect magnetic flux density of the magnetic field and generate a first signal indicating a position of the magnetic unit relative to the first or second magnetic field sensing unit or a second signal indicating movement of the magnetic unit relative to the first or second magnetic field sensing unit.

The present disclosure further provides an input system for a finger touch interface, which comprises: a magnetic unit worn on a tip of a user's thumb for establishing a magnetic field; at least a first magnetic field sensing unit worn on a tip of any finger except the thumb, wherein the first magnetic field sensing unit includes a first substrate and a plurality of first sensors mounted on the first substrate; at least a second magnetic field sensing unit worn on a segment of any finger except the thumb, wherein the second magnetic field sensing unit includes a second substrate and a plurality of second sensors mounted on the second substrate; and a computing unit connected to the first magnetic field sensing unit and the second magnetic field sensing unit through a network, wherein the first or second sensors are configured to detect magnetic flux density of the magnetic field and generate a first signal indicating a position of the magnetic unit relative to the first or second magnetic field sensing unit or a second signal indicating movement of the magnetic unit relative to the first or second magnetic field sensing unit, and the first or second signal is transmitted through the network to the computing unit so as to serve as an input instruction of the computing unit.

The present disclosure further provides an input method for a finger touch interface, which comprises: establishing a magnetic field with a magnetic unit worn on a tip of a user's thumb; sensing a position of the magnetic unit in the magnetic field to generate a first signal or sensing movement of the magnetic unit in the magnetic field to generate a second signal with at least a first or second magnetic field sensing unit, wherein the first magnetic field sensing unit is worn on a tip of any finger except the thumb, and the second magnetic field sensing unit is worn on a segment of any finger except the thumb; receiving the first or second signal with a microprocessor and transmitting the first or second signal from the microprocessor to a computing unit through a network; and identifying the first or second signal with the computing unit to serve as an input instruction of the computing unit.

In an embodiment, the first sensors are one-dimensional or two-dimensional Hall sensors and arranged on the first substrate in an array of 3×3, and the array-arranged first sensors are separated from one another by a distance of 4 mm.

In an embodiment, the second sensors are one-dimensional or two-dimensional Hall sensors and arranged on the second substrate in an array of 1×8, and the array-arranged second sensors are separated from one another by a distance of 5 mm.

In an embodiment, the magnetic unit is a neodymium magnet.

In an embodiment, the magnetic flux density of the magnetic field detected by the first/second sensors is in a range of 0 to 200 G In an embodiment, the computing unit identifies the second signal using a Graffiti handwriting input method.

In an embodiment, the input system further comprises a microprocessor coupled to the first magnetic field sensing unit and the second magnetic field sensing unit for receiving the first/second signal and transmitting the first/second signal to the computing unit through the network.

According to the present disclosure, a user's index finger (and other fingers) can be used as an input area and the user's thumb can be used to interact with the input area so as to generate a signal as an input instruction of the computing unit. The input device, system and method for a finger touch interface according to the present disclosure are different from the conventional input methods using human gestures or voice. Further, the interaction process does not need to be seen. Instead, the position of the thumb can be determined by skin touch. Therefore, the present disclosure provides input technologies with high privacy and security.

DETAILED DESCRIPTION OF PREFERRED EMBODIMENTS

The following illustrative embodiments are provided to illustrate the disclosure of the present disclosure, these and other advantages and effects can be apparent to those in the art after reading this specification. Various modifications and variations can be made without departing from the spirit of the present disclosure.

Figure 1A:
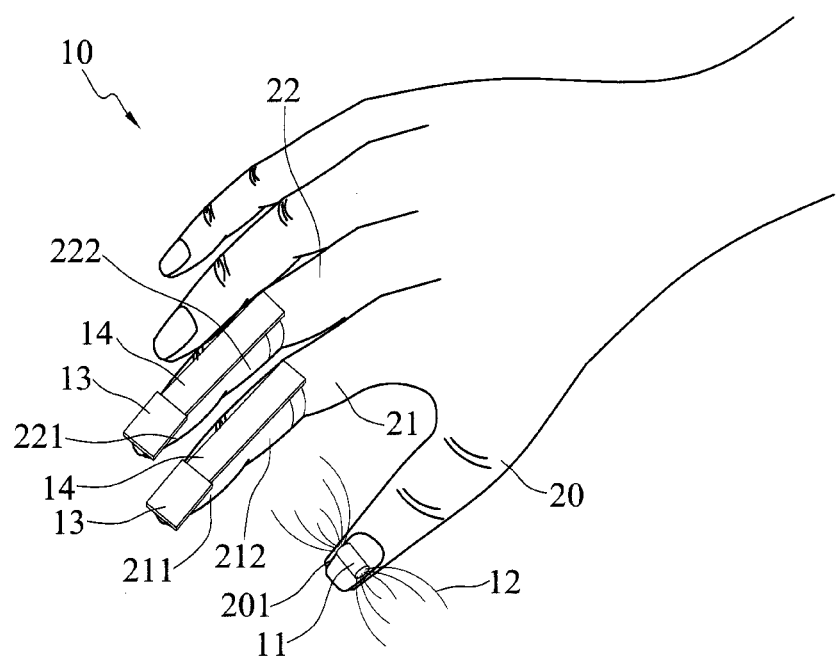
FIG. 1A is a schematic diagram of an input device for a finger touch interface according to the present disclosure.
Figure 1B:
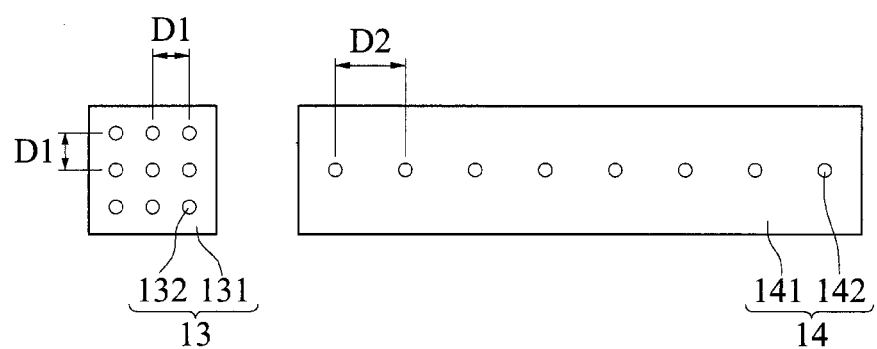
FIG. 1B is a schematic diagram of a first magnetic field sensing unit and a second magnetic field sensing unit of the input device according to the present disclosure.

Referring to FIGS. 1A and 1B, an input device 10 for a finger touch interface according to the present disclosure has a magnetic unit 11, at least a first magnetic field sensing unit 13, and at least a second magnetic field sensing unit 14. The magnetic unit 11 is worn on the tip 201 of a user's thumb 20 (for example, on the thumbnail) to establish a magnetic field 12. The first magnetic field sensing unit 13 is worn on the tip of any finger except the thumb. Referring to FIG. 1A, the first magnetic field sensing unit 13 is worn on the tip 211 of the user's index finger 21 (for example, the index finger nail) and/or the tip 221 of the user's middle finger 22 (for example, the middle finger nail). Further, the first magnetic field sensing unit 13 can be worn on any one or all of the user's index finger, middle finger, ring finger and little finger.

The second magnetic field sensing unit 14 is worn on a segment of any finger except the thumb. Referring to FIG. 1A, the second magnetic field sensing unit 14 is worn on a segment 212 of the index finger 21, for example, the first segment and/or the second segment of the index finger 21. The second magnetic field sensing unit 14 can also be worn on a segment 222 of the middle finger 22. The second magnetic field sensing unit 14 is used to provide the size of the sensing area. According to the practical need, one or more second magnetic field sensing units 14 can be worn on a segment of any one or all of the user's index finger, middle finger, ring finger and little finger.

Referring to FIG. 1B, the first magnetic field sensing unit 13 has a first substrate 131 and a plurality of first sensors 132 mounted on the first substrate 131. The second magnetic field sensing unit 14 has a second substrate 141 and a plurality of second sensors 142 mounted on the second substrate 141.

In an embodiment, the first sensors 132 are arranged on the first substrate 131 in an array of 3×3 or larger and the first sensors 132 are separated from one another by a distance D1 of 4 mm. Further, the second sensors 142 are arranged on the second substrate 141 in an array of 1×8 or larger and the second sensors 142 are separated from one another by a distance D2 of 5 mm.

In an embodiment, the first sensors 132 and/or the second sensors 142 are one-dimensional or two-dimensional Hall sensors, for example, Winson WSH138 Hall sensors. Further, the magnetic unit 11 is a neodymium magnet.

The first/second sensors 132, 142 are used to detect magnetic flux density of the magnetic field 12. When the magnetic unit 11 is moved close to the first/second magnetic field sensing unit 13, 14 and the magnetic field 12 is sensed by the first/second sensors 132, 142, a first signal or a second signal can be generated by the first/second sensors 132, 142 according to variation of the magnetic flux density of the magnetic field 12. The first signal indicates position of the magnetic unit 11 relative to the first/second magnetic field sensing unit 13, 14, and the second signal indicates movement of the magnetic unit 11 relative to the first/second magnetic field sensing unit 13, 14. In an embodiment, the second signal indicates the trace of movement of the magnetic unit 11 in the magnetic field 12 that is detectable by the first/second sensors 132, 142.

In an embodiment, the magnetic flux density of the magnetic field 12 detected by the first/second sensors 132, 142 is in a range of 0 to 200 Gauss (G).

In application, since the first sensors 132 of the first magnetic field sensing unit 13 are arranged in an array of 3×3 or larger, a small-range movement is suitable to be performed on the first magnetic field sensing unit 13. For example, the thumb with the magnetic unit 11 can perform an action of drawing a circle or writing a word on the first magnetic field sensing unit 13. Further, since the second sensors 142 of the second magnetic field sensing unit 14 are arranged in an array of 1×8 or larger, a linear movement or clicking is suitable to be performed on the second magnetic field sensing unit 14. Furthermore, a plurality of first/second magnetic field sensing units 13, 14 can be worn on both the index finger and the middle finger to expand the input area.

Figure 2:
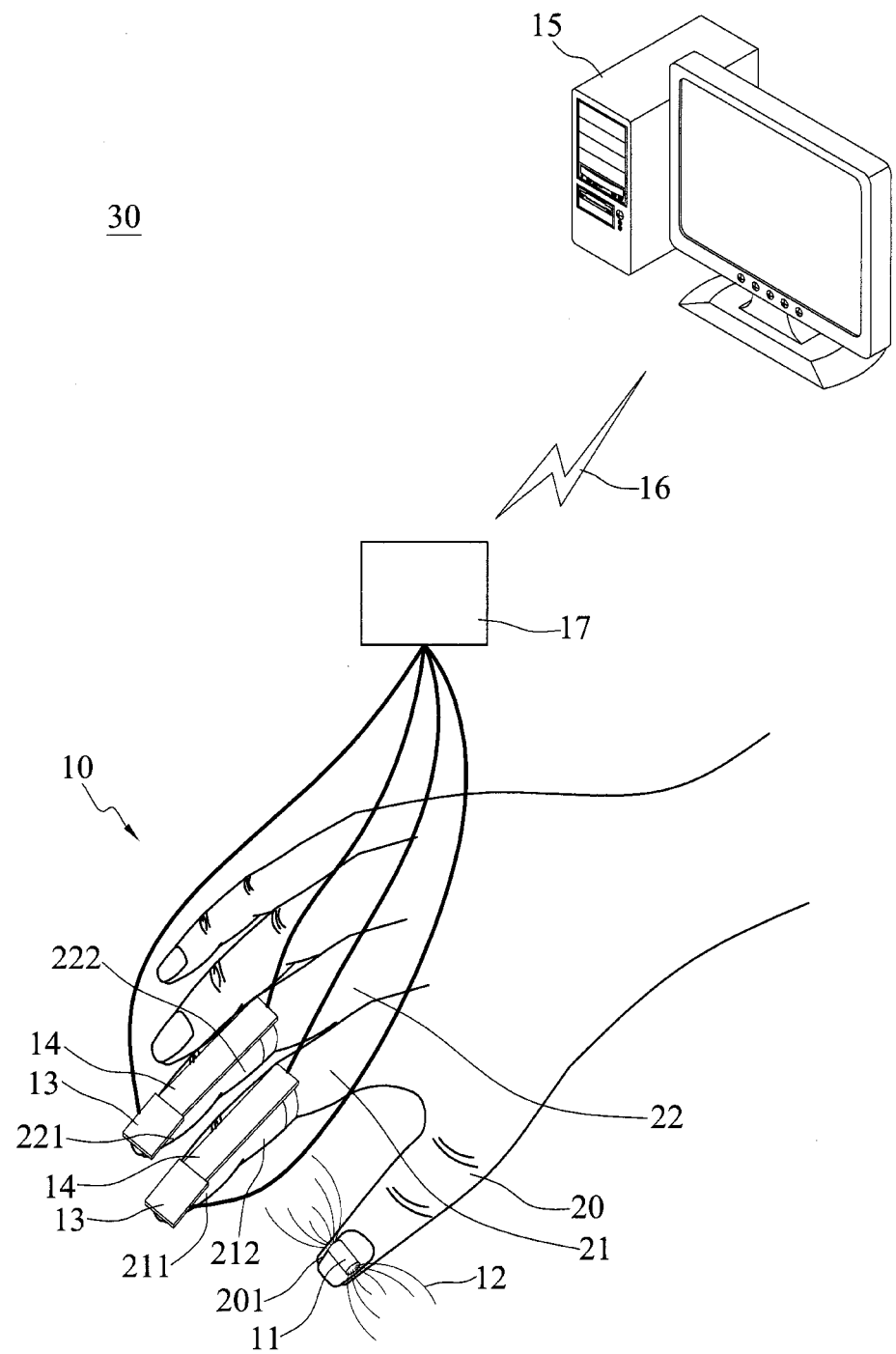
FIG. 2 is a schematic diagram of an input system for a finger touch interface according to the present disclosure.

FIG. 2 shows an input system 30 for a finger touch interface according to the present disclosure. Referring to FIG. 2, the input system 30 includes the above-described input device 10, a computing unit 15 and a microprocessor 17.

The microprocessor 17 is coupled to the first magnetic field sensing unit 13 and the second magnetic field sensing unit 14 to receive the first/second signal. Further, the microprocessor 17 transmits the first/second signal through a network 16 (wired or wireless) to the computing unit 15 (for example, a mainframe computer or a server). The first/second signal serves as an input instruction of the computing unit 15.

In an embodiment, the computing unit 15 identifies the second signal using a Graffiti handwriting input method so as to determine which character the trace of the movement indicated by the second signal corresponds to.

In application, different button clicking configurations can be defined for the first magnetic field sensing unit 13 and the second magnetic field sensing unit 14 on different fingers. That is, different positions of the magnetic unit 11 on the first magnetic field sensing unit 13 and the second magnetic field sensing unit 14 are identified as different blocks that represent different instructions. For example, according to the habit of the user, each of the index finger and the middle finger can be divided into 5 blocks, the ring finger can be divided into 4 blocks, and the little finger can be divided into 2 blocks. Totally, there are 16 blocks, which represent 16 different input instructions.

Figure 3:
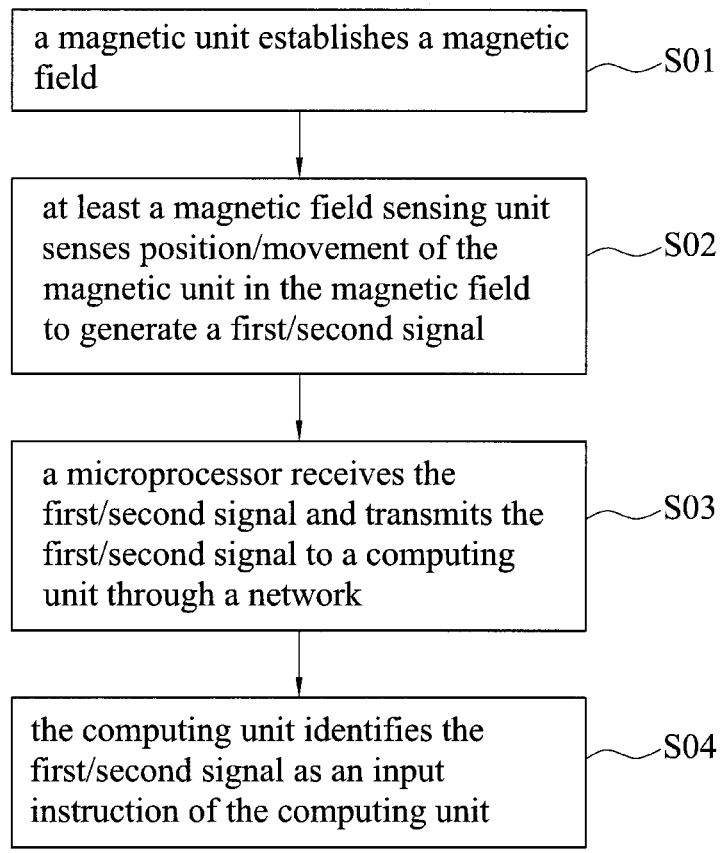
FIG. 3 is a schematic flow diagram showing an input method for a finger touch interface according to the present disclosure.

FIG. 3 shows an input method for a finger touch interface according to the present disclosure. Referring to FIG. 3, first at step S01, a magnetic unit worn on the tip of a user's thumb establishes a magnetic field. Then, at step S02, at least a first/second magnetic field sensing unit senses position of the magnetic unit in the magnetic field to generate a first signal or senses movement of the magnetic unit in the magnetic field to generate a second signal. Therein, the first magnetic field sensing unit is worn on a tip of any finger except the thumb, and the second magnetic field sensing unit is worn on a segment of any finger except the thumb.

Subsequently, at step S03, a microprocessor receives the first/second signal and transmits the first/second signal from the microprocessor to a computing unit through a network. Then, at step S04, the computing unit identifies the first/second signal as an input instruction of the computing unit.

According to the present disclosure, a user's index finger (and other fingers) can be used as an input area and the user's thumb can be used to interact with the input area so as to generate a signal as an input instruction of the computing unit. The input device, system and method for a finger touch interface according to the present disclosure are different from the conventional input methods using human gestures or voice. Further, the interaction process does not need to be seen. Instead, the position of the thumb can be determined by skin touch. Therefore, the present disclosure provides input technologies with high privacy and security.

The above-described descriptions of the detailed embodiments are only to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. An input device for a finger touch interface, comprising:
    a magnetic unit worn on a tip of a user's thumb for establishing a magnetic field;
    at least a first magnetic field sensing unit worn on a tip of any finger except the thumb, wherein the first magnetic field sensing unit includes a first substrate and a plurality of first sensors mounted on the first substrate; and
    at least a second magnetic field sensing unit worn on a segment of any finger except the thumb, wherein the second magnetic field sensing unit includes a second substrate and a plurality of second sensors mounted on the second substrate;
    wherein the first sensors or the second sensors are configured to be used as an input area to detect magnetic flux density of the magnetic field while the user's thumb interacting with the input area so as to generate a first signal indicating a position of the magnetic unit relative to the first or second magnetic field sensing unit or a second signal indicating movement of the magnetic unit relative to the first or second magnetic field sensing unit.

2. The input device of claim 1, wherein the first sensors are one-dimensional or two-dimensional Hall sensors and arranged on the first substrate in an array of 3×3.

3. The input device of claim 2, wherein the first sensors are arranged in an array and separated from one another by a distance of 4 mm.

4. The input device of claim 1, wherein the second sensors are one-dimensional or two-dimensional Hall sensors and arranged on the second substrate in an array of 1×8.

5. The input device of claim 4, wherein the second sensors are arranged in an array and separated from one another by a distance of 5 mm.

6. The input device of claim 1, wherein the magnetic unit is a neodymium magnet.

7. The input device of claim 1, wherein the magnetic flux density of the magnetic field detected by the first sensors or the second sensors is in a range of from 0 to 200 G.

8. An input system for a finger touch interface, comprising:
    a magnetic unit worn on a tip of a user's thumb for establishing a magnetic field;
    at least a first magnetic field sensing unit worn on a tip of any finger except the thumb, wherein the first magnetic field sensing unit includes a first substrate and a plurality of first sensors mounted on the first substrate;
    at least a second magnetic field sensing unit worn on a segment of any finger except the thumb, wherein the second magnetic field sensing unit includes a second substrate and a plurality of second sensors mounted on the second substrate; and
    a computing unit connected to the first magnetic field sensing unit and the second magnetic field sensing unit through a network,
    wherein the first sensors or the second sensors are configured to be used as an input area to detect magnetic flux density of the magnetic field while the user's thumb interacting with the input area so as to generate a first signal indicating a position of the magnetic unit relative to the first or second magnetic field sensing unit or a second signal indicating movement of the magnetic unit relative to the first or second magnetic field sensing unit, and the first signal or the second signal is transmitted through the network to the computing unit and serves as an input instruction of the computing unit.

9. The input system of claim 8, wherein the computing unit is configured to identify the second signal using a Graffiti handwriting input method.

10. The input system of claim 8, further comprising a microprocessor coupled to the first magnetic field sensing unit and the second magnetic field sensing unit, and configured to receive the first signal and the second signal and transmit the first signal and the second signal to the computing unit through the network.

11. The input system of claim 8, wherein the first sensors are one-dimensional or two-dimensional Hall sensors and arranged on the first substrate in an array of 3×3.

12. The input system of claim 11, wherein the first sensors are arranged in an array and separated from one another by a distance of 4 mm.

13. The input system of claim 8, wherein the second sensors are one-dimensional or two-dimensional Hall sensors and arranged on the second substrate in an array of 1×8.

14. The input system of claim 13, wherein the second sensors are arranged in an array and separated from one another by a distance of 5 mm.

15. The input system of claim 8, wherein the magnetic unit is a neodymium magnet.

16. The input system of claim 8, wherein the magnetic flux density of the magnetic field detected by the first sensors or the second sensors is in a range of from 0 to 200 G.

17. An input method for a finger touch interface, comprising:
    establishing a magnetic field by a magnetic unit worn on a tip of a user's thumb;
    sensing a position of the magnetic unit in the magnetic field to generate a first signal or sensing movement of the magnetic unit in the magnetic field to generate a second signal via an input area defined by at least a first or second magnetic field sensing unit while the user's thumb interacting with the input area, wherein the first magnetic field sensing unit is worn on a tip of any finger except the thumb, and the second magnetic field sensing unit is worn on a segment of any finger except the thumb;
    receiving the first signal or the second signal by a microprocessor and transmitting the first signal or the second signal from the microprocessor to a computing unit through a network; and identifying the first signal or the second signal by the computing unit to serve as an input instruction of the computing unit.

18. The input method of claim 17, wherein the first magnetic field sensing unit includes a first substrate and a plurality of first sensors mounted on the first substrate, and the second magnetic field sensing unit includes a second substrate and a plurality of second sensors mounted on the second substrate.

19. The input method of claim 18, further comprising detecting, by the first sensors or the second sensors, magnetic flux density of the magnetic field, wherein the magnetic flux density is in a range of from 0 to 200 G.

20. The input method of claim 17, further comprising identifying, by the computing unit, the second signal using a Graffiti handwriting input method.

* * * * *

UNITED STATES PATENT AND TRADEMARK OFFICE
CERTIFICATE OF CORRECTION

PATENT NO. : 10,095,309 B2
APPLICATION NO. : 15/588165
DATED : October 9, 2018
INVENTOR(S) : Bing-Yu Chen et al.

It is certified that error appears in the above-identified patent and that said Letters Patent is hereby corrected as shown below:

On the Title Page

Item (71):
Delete "Mediatek Inc., Hsin Chu OT (CN)"
Insert --Mediatek Inc., Hsin Chu (TW)--

Item (72):
Delete "Shuo Yang; Taipei (TW)"
Insert --Shuo Yang; Hangzhou (CN)--

Item (73):
Insert --National Taiwan University, Taipei (TW)--

Signed and Sealed this
Tenth Day of September, 2019

Andrei Iancu
*Director of the United States Patent and Trademark Office*